US011822031B2

(12) United States Patent
Heieren et al.

(10) Patent No.: US 11,822,031 B2
(45) Date of Patent: Nov. 21, 2023

(54) CARRIER FOR SEISMIC NODES

(71) Applicant: MAGSEIS FAIRFIELD ASA, Lysaker (NO)

(72) Inventors: Nils Heieren, Oslo (NO); Kristian Røislien, Oslo (NO)

(73) Assignee: MAGSEIS FAIRFIELD ASA, Lysaker (NO)

( * ) Notice: Subject to any disclaimer, the term of this patent is extended or adjusted under 35 U.S.C. 154(b) by 255 days.

(21) Appl. No.: 17/252,918

(22) PCT Filed: Jul. 11, 2019

(86) PCT No.: PCT/NO2019/050150
§ 371 (c)(1),
(2) Date: Dec. 16, 2020

(87) PCT Pub. No.: WO2020/013708
PCT Pub. Date: Jan. 16, 2020

(65) Prior Publication Data
US 2021/0190986 A1    Jun. 24, 2021

(30) Foreign Application Priority Data
Jul. 12, 2018 (NO) .................................. 20180981

(51) Int. Cl.
*G01V 1/38* (2006.01)
(52) U.S. Cl.
CPC .......... *G01V 1/3852* (2013.01); *G01V 1/3817* (2013.01); *G01V 2210/1427* (2013.01)

(58) Field of Classification Search
CPC ......... G01V 1/3852; G01V 2210/1427; G01V 1/3817; G01V 1/3843; G01V 2200/00; B63C 11/52; B63B 2027/165; B63G 8/001
See application file for complete search history.

(56) References Cited

U.S. PATENT DOCUMENTS 4,082,177 A    4/1978 Aidlin
8,556,540 B2   10/2013 Thompson et al.
(Continued)

FOREIGN PATENT DOCUMENTS

CN    101365964 A    2/2009
CN    107140374 A    9/2017
(Continued)

OTHER PUBLICATIONS

Extended European Search Report dated Feb. 22, 2022 for European Application No. 19833077.1, 8 pages.
(Continued)

*Primary Examiner* — Ian J Lobo
(74) *Attorney, Agent, or Firm* — SAGE PATENT GROUP

(57) ABSTRACT

The invention relates to a carrier (5) for transporting seismic nodes (9) to and from a sea floor (4), comprising an interior (8) for storing the nodes and a node transfer position (10) for transferring nodes (9) to and from the carrier (5); a support (14) for supporting the nodes (9) in a row (33) between the interior (8) of the carrier (5) and the node transfer position (10); and an endless driven belt or chain (11) with pushers (19) for pushing the row (33) of nodes (9). The invention also relates to a seismic node (9) adapted to use in the carrier (5). Further the invention relates to a method for loading seismic nodes (9) into the carrier (5), and a method for unloading seismic nodes (9) from the carrier (5).

14 Claims, 5 Drawing Sheets

(56) References Cited

U.S. PATENT DOCUMENTS

| | | | |
|---|---|---|---|
| 9,611,018 B2* | 4/2017 | Gateman | B63G 8/001 |
| 10,114,137 B2* | 10/2018 | Fyffe | B63G 8/001 |
| 2005/0015581 A1 | 7/2005 | Bath | |
| 2005/0155814 A1 | 7/2005 | Bath et al. | |
| 2006/0159524 A1* | 7/2006 | Thompson | G01V 1/3852 |
| | | | 405/190 |
| 2009/0052992 A1 | 2/2009 | Thompson et al. | |
| 2011/0217123 A1 | 9/2011 | Jewell et al. | |
| 2017/0028520 A1 | 10/2017 | Fyfee | |
| 2017/0285200 A1 | 10/2017 | Fyffe et al. | |

FOREIGN PATENT DOCUMENTS

| | | | |
|---|---|---|---|
| WO | 03083514 A1 | 10/2003 | |
| WO | 2009/026002 | 2/2009 | |
| WO | 2014085375 A1 | 6/2014 | |
| WO | WO-2015034368 A1 * | 3/2015 | B63G 8/001 |
| WO | 2016/064280 | 4/2016 | |
| WO | WO-2017091480 A1 * | 6/2017 | G01V 1/308 |
| WO | 2018/160459 | 9/2018 | |

OTHER PUBLICATIONS

International Search Report issued in PCT/NO2019/050150, dated Nov. 9, 2019, pp. 1-3.

Written Opinion issued in PCT/NO2019/050150, dated Nov. 9, 2019, pp. 1-6.

Office Action dated Feb. 28, 2023 for Chinese Application No. 201980042191.9, 10 pages.

Song, Zhang et al.; "Z700 Node Seismic Acquisition System"; EGP, 2011, 21(5), pp. 338-342 (5 pages). (English Abstract provided).

Office Action dated Aug. 26, 2023 for Chinese Patent Application No. 201980042191.9, 9 pages.

* cited by examiner

CARRIER FOR SEISMIC NODES

The invention relates to the field of marine seismic exploration. More particularly, the invention relates to a carrier for transporting seismic nodes to and from a sea floor, comprising an interior for storing the nodes during the transport, and means for moving the nodes into and out of the interior of the carrier. The invention also relates to a seismic node for acquiring seismic data at a sea floor, a method for loading seismic nodes into the carrier, and a method for unloading seismic nodes from the carrier.

In marine seismic exploration one or more seismic sources, typical air guns located in the sea, emits sound waves. The sound waves are reflected and refracted by the sea floor and interfaces between subsurface strata with different elastic properties, and amplitudes and arrival times of the various sound waves are sensed by seismic sensors and analysed to provide information about the subsurface. Two main techniques are used to sense the sound waves; one is to tow seismic streamers containing sensors typically including hydrophones behind a vessel slightly below the sea surface, the other is to deploy seismic nodes containing seismic sensors typically including hydrophones and geophones at the sea floor. This invention relates to the latter technique.

When seismic nodes are deployed at the sea floor, they are normally deployed in a rectangular grid. The distances between nodes along lines of the grid are typically between 25 and 1000 metres, and the distances between the lines are typically between 100 and 1000 metres. After the nodes have been deployed, air guns towed by a vessel are fired. Sound waves from the shots and sound waves reflected and refracted by the sea floor and the interfaces between the subsurface strata are sensed by the sensors of the nodes. The nodes may be connected by a cable for transfer of seismic data representing the sensed sound waves to a surface vessel. Alternatively, the nodes may be autonomous, i.e. the nodes are connected by a cable for mechanical connection only, or there is no connection at all between the nodes. If the nodes are autonomous, they must in addition to the seismic sensors also include an energy source, e.g. a battery, a recorder, and a memory for storing seismic data representing the reflected and refracted sound waves. After the firing of the air guns is finished, the autonomous nodes are retrieved to a vessel and the seismic data are transferred from the memories to a data storage unit for later analysis.

WO 2016064280 A1 describes a method for seismic survey by autonomous seismic nodes at a sea floor, comprising attaching the nodes to a rope, loading the rope with the nodes into a node deployer, lowering the node deployer into the sea, towing the node deployer above the sea floor, deploying the rope with the nodes at the sea floor, collecting seismic data by the nodes, retrieving the rope with the nodes from the sea floor, and unloading seismic data from the nodes. It further describes a node deployer for deploying a rope with seismic nodes at the sea floor, comprising a magazine for the rope with the nodes.

U.S. Pat. No. 8,556,540 B2 describes a deployment and retrieval apparatus for ocean bottom seismic receivers, the apparatus being a remotely operated vehicle (ROV) having a carrier attached thereto and carrying a plurality of receivers. The carrier includes a frame in which is mounted a structure for seating and releasing the receivers. The structure includes one or more movable conveyors disposed to move receivers along a linear path relative to the frame in order to discharge and retrieve ocean bottom seismic receivers.

The purpose of the invention is to provide a carrier for transporting seismic nodes between a vessel on a sea surface and a depth near or at a sea floor. The carrier shall enable transport of a large number of nodes, and enable cooperation with a tool for transferring nodes to and from the carrier, particularly from the carrier to the sea floor and from the sea floor to the carrier. A further purpose is to provide a seismic node for acquiring seismic data at a sea floor, which node shall be adapted to be transported by the carrier, internal handling in the carrier, and moved by the tool. A further purpose is to provide a method for loading seismic nodes into the carrier, and a method for unloading seismic nodes from the carrier. At least the invention shall provide an alternative to prior art. Features, advantages and further purposes of the invention and how they are achieved will appear from the description, the drawings and the claims.

The invention thus relates to a carrier for transporting seismic nodes to and from a sea floor, comprising an interior for storing the nodes during the transport, and means for moving the nodes into and out of the interior of the carrier. According to the invention the carrier comprises a node transfer position for transferring nodes to and from the carrier; a support for supporting the nodes in a row between the interior of the carrier and the node transfer position; and an endless driven belt or chain with pushers for pushing the row of nodes, a drive wheel or sprocket for driving the belt or chain, and a motor for driving the drive wheel or sprocket. The nodes are stored in the interior of the carrier. "The interior of the carrier" shall mean any place in the carrier not in the node transfer position. This enables storing a large number of nodes in the carrier. The nodes rest on the support, and the pushers push the nodes along the support, which enables moving each node in the carrier between the interior of the carrier and the node transfer position. The carrier may comprise a guide for guiding the nodes when they are pushed along the support. At the node transfer position, the node can be transferred between the carrier and the sea floor or any other place, e.g. the deck of a vessel. This transfer may be carried out manually or by a tool. The tool may be a manipulator arm or any means that can transfer the nodes, e.g. a deployment system or an arm with fewer degrees of freedom than a manipulator arm, maybe only translation along 2 or 3 axes. Thus, there is provided a compact carrier which enables transporting a large number of seismic nodes between a vessel on a sea surface and a depth near or at a sea floor, and which enables cooperation with a tool for transferring nodes to and from the carrier.

In one alternative the node transfer position is on a ramp outside the support. In another alternative the node transfer position is on the support.

Preferably the belt or chain is positioned below the support, and the pushers extend above the support. In connection with the belt or chain and support, "below" shall mean at a lower level than, and "above" shall mean at a higher level than, i.e. not necessarily directly under and over, respectively. In one alternative the pushers are spaced along the belt or chain with a distance corresponding to a length of the node plus a clearance. This enables placing the nodes between the pushers, and the nodes can thereby push the nodes along the support. In another alternative, the pushers are adapted to push gripping portions of the nodes. Such gripping portions may be formed in the undersides of the nodes. Both alternatives provide a stable positioning of the nodes in the carrier with a reliable movement of the nodes within the carrier.

In one alternative the support is a longitudinal support, and one belt or chain is situated on each side of and below the support, with the pushers extending above the support. The two belts or chains may be driven by respective drive wheels or sprockets with a common drive shaft driven by the motor. The pushers can then be attached to both belts or chains. The use of two chains provides a reliable and stable embodiment.

In another alternative there are two longitudinal supports for each row of nodes, and the belt or chain is situated between and below the supports, with the pushers extending above the supports. In this alternative there is only one chain or belt, which may be more cost-effective than two chains or belts.

The components for moving the nodes between the interior of the carrier and the node transfer position may be arranged in magazines. Each magazine may include components for moving one row of nodes. The magazines are preferably exchangeable.

The carrier may be dockable to an ROV (Remotely Operated Vehicle). The carrier may be docked to the ROV by a conventional docking system, including probes and corresponding receptacles for mechanical attachment of the carrier, and plugs and sockets or other connectors for transfer of electric and/or hydraulic power and electric control signals. The carrier may be docked to the underside of the ROV, and a manipulator arm of the ROV may be used to transfer the nodes to and from the carrier. The carrier may be stackable and dockable to another carrier, and two or more carriers may then be stacked on top of each other. These two or more stacked carriers may then be docked to the ROV together, and electric and/or hydraulic power and electric control signals may be transferred between the carriers. This provides an efficient way of transporting the nodes between the sea surface and the sea floor.

The motor that drives the drive sprocket may be an electric motor. The motor may, however, be hydraulic, which may be favourable if hydraulic power is available from the ROV. Hydraulic power may be transferred from the ROV to the carrier by couplings for high pressure fluid forming part of the docking system.

The invention also relates to a seismic node for acquiring seismic data at a sea floor, comprising sensors for seismic signals, a processor for the seismic signals, a recorder, a memory for storing data representing the seismic signals, and a power source. The node is to be transported between a vessel on a sea surface and a depth near or at the sea floor by a carrier. According to the invention the node is adapted to use in the carrier of the invention. First and foremost, this adaption comprises adapting the shape and size of the node to fit into the carrier, for a placement on the support and pushing by the pushers The invention further relates to a method for loading seismic nodes into the carrier, comprising placing a node in the node transfer position; starting the belt or chain to make a pusher push the node towards the interior of the carrier; stopping the belt or chain when the node has moved a length corresponding to a length of the node plus the clearance; and repeating the above steps, causing the nodes to form a row between the interior of the carrier and the node transfer position. The placing of the node in the node transfer position may be carried out manually or by the above discussed tool, e.g. a manipulator arm. Further, as discussed above, the node transfer position may be on a ramp outside the support. In this case, the node is pushed onto the support. This may also be carried out manually or by the above discussed tool. Alternatively, the node transfer position may be on the support, and in this case, it is not required to push the node onto the support.

The invention also relates to a method for unloading seismic nodes from the carrier, wherein the nodes are stored on the support in a row between the interior of the carrier and the node transfer position. The method comprises starting the belt or chain to make the pushers push the row of nodes towards the node transfer position; stopping the belt or chain when a node has arrived at the node transfer position; removing the node from the node transfer position, which may be carried out manually or by the above discussed tool; and repeating the above steps.

A seismic survey using the invention may be carried out as follows: Nodes are loaded into the carrier on shore or at a vessel's deck. This loading may be done manually or by the above discussed tool. If magazines are used, the nodes may be loaded into the magazines while the magazines are inside the carrier or outside the carrier, with a subsequent placing of the magazines into the carrier. The carrier is then brought to the sea floor, typically by docking the carrier to an ROV and lowering the ROV into the sea by a crane from the vessel and moving the ROV to the sea floor, where the nodes are unloaded from the carrier and placed on the sea floor by means of the above discussed tool. If required, the ROV with the carrier may be moved to the vessel's deck for another loading of nodes, and again moved to the sea floor for continued unloading and placing of nodes on the sea floor by the tool. Seismic data are then acquired by the nodes. The acquisition of seismic data may be passive, i.e. the seismic nodes sense and register natural and manmade sound and vibrations coming from all directions, or the nodes may sense and register sound and vibrations caused by firing of seismic sources. When the acquisition of seismic data has been completed, the nodes are picked up from the sea floor and loaded into the carrier by the above discussed tool, and the ROV with the carrier is moved to the sea surface and lifted onto the vessel's deck. The nodes are then unloaded from the carrier for a transfer of seismic data to a data storage unit. This unloading may take place at the vessel's deck or on shore, and may be done manually or by the above discussed tool. If magazines are used, the nodes may be unloaded from the magazines while the magazines are inside the carrier or after the magazines have been removed from the carrier.

Some embodiments of the invention will now be described with reference to the accompanying drawings, in which.

Figure 1:
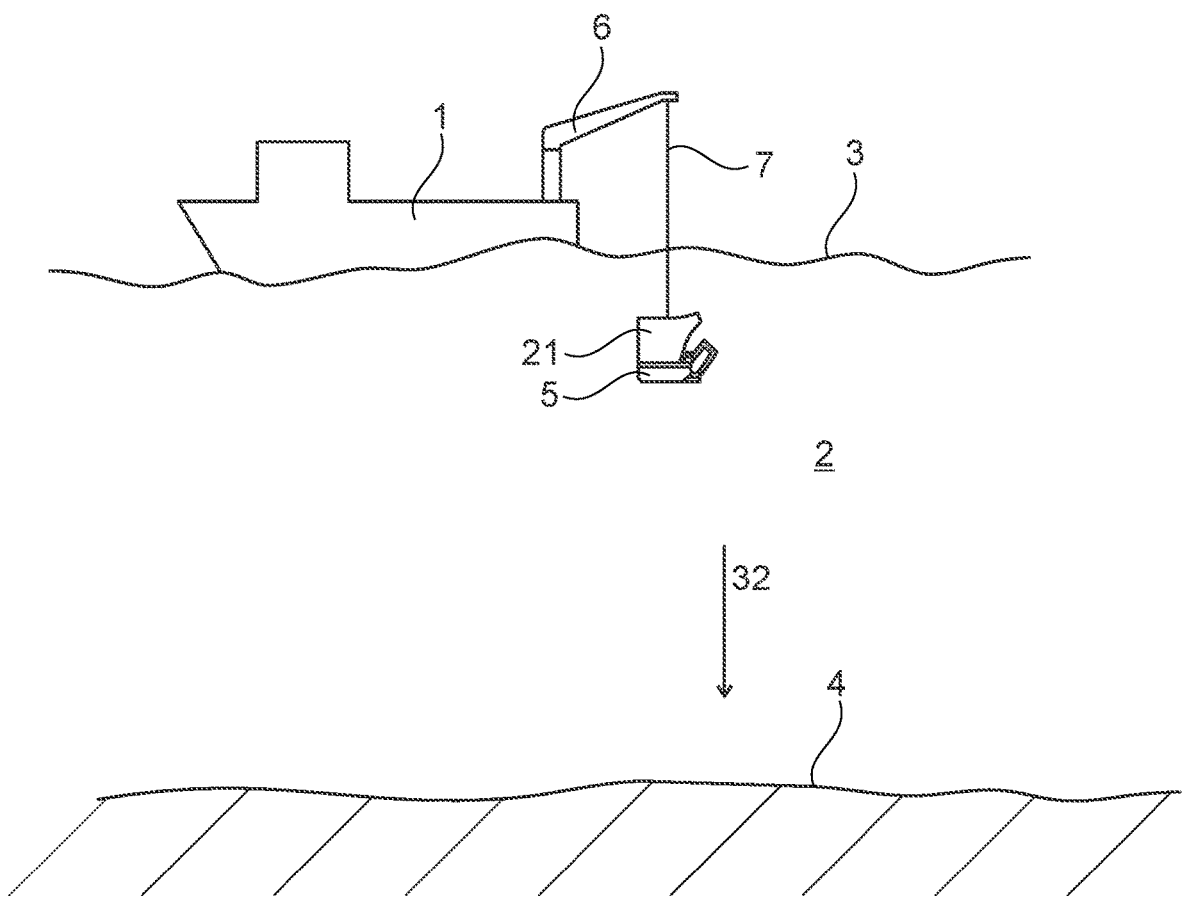
FIG. 1 illustrates a vessel with a crane lowering an ROV with a carrier for seismic nodes to a sea floor.

FIG. 1 illustrates a vessel 1 floating at a sea surface 3 of a sea 2. An ROV 21 has been lowered into the sea 2 by means of a cable 7 from a crane 6. A carrier 5 filled with seismic nodes is located underneath the ROV. The nodes were loaded into the carrier 5 at the vessel, and the carrier was then docked to the ROV before the ROV was lowered into the sea. After being lowered into the sea 2, the ROV 21 is moved in downwards vertical direction 32 to a sea floor 4.

Figure 2:
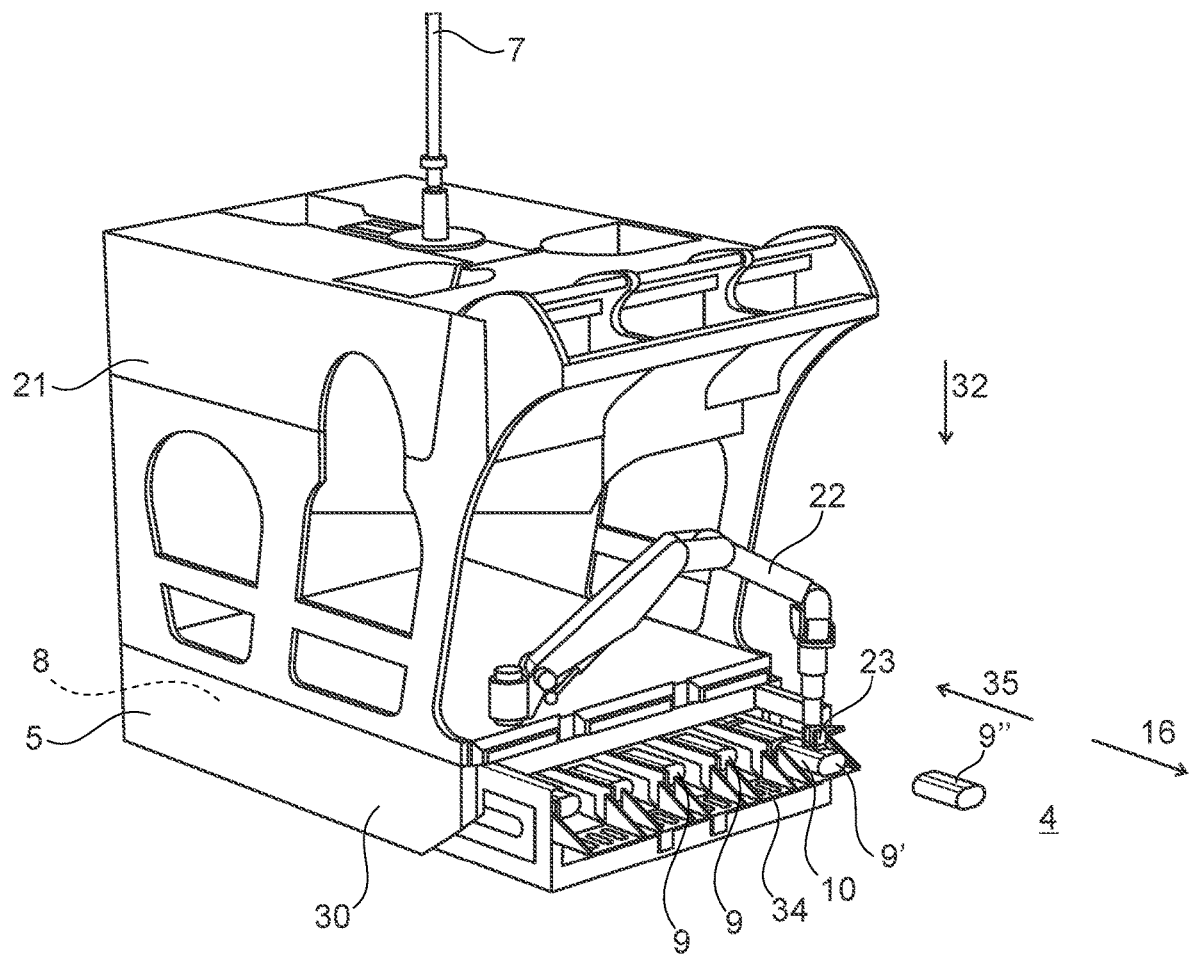
FIG. 2 illustrates the ROV with the carrier for seismic nodes at the sea floor.

FIG. 2 illustrates the ROV 21 after the movement to the sea floor 4. The ROV is of a known kind, including a propulsion and positioning system, a manipulator arm 22, a video camera, and lights. The ROV 21 may also include sensors, e.g. pressure sensors, positioning sensors and proximity sensors, and other equipment required to carry out its tasks. The ROV 21 is controlled by a control system which may be in the ROV or on the vessel, or partly in the ROV and partly on the vessel. An operator on the vessel controls the control system. The cable 7 transfers electric power and control signals from the vessel to the ROV, and video signals and sensor signals from the ROV to the vessel.

The carrier 5 is docked to the ROV by a not illustrated docking system, which includes probes and corresponding receptacles for mechanical attachment of the carrier, and plugs and sockets for transfer of electric power and electric control signals. There may also be hydraulic connectors for transfer of hydraulic power.

Figure 3:
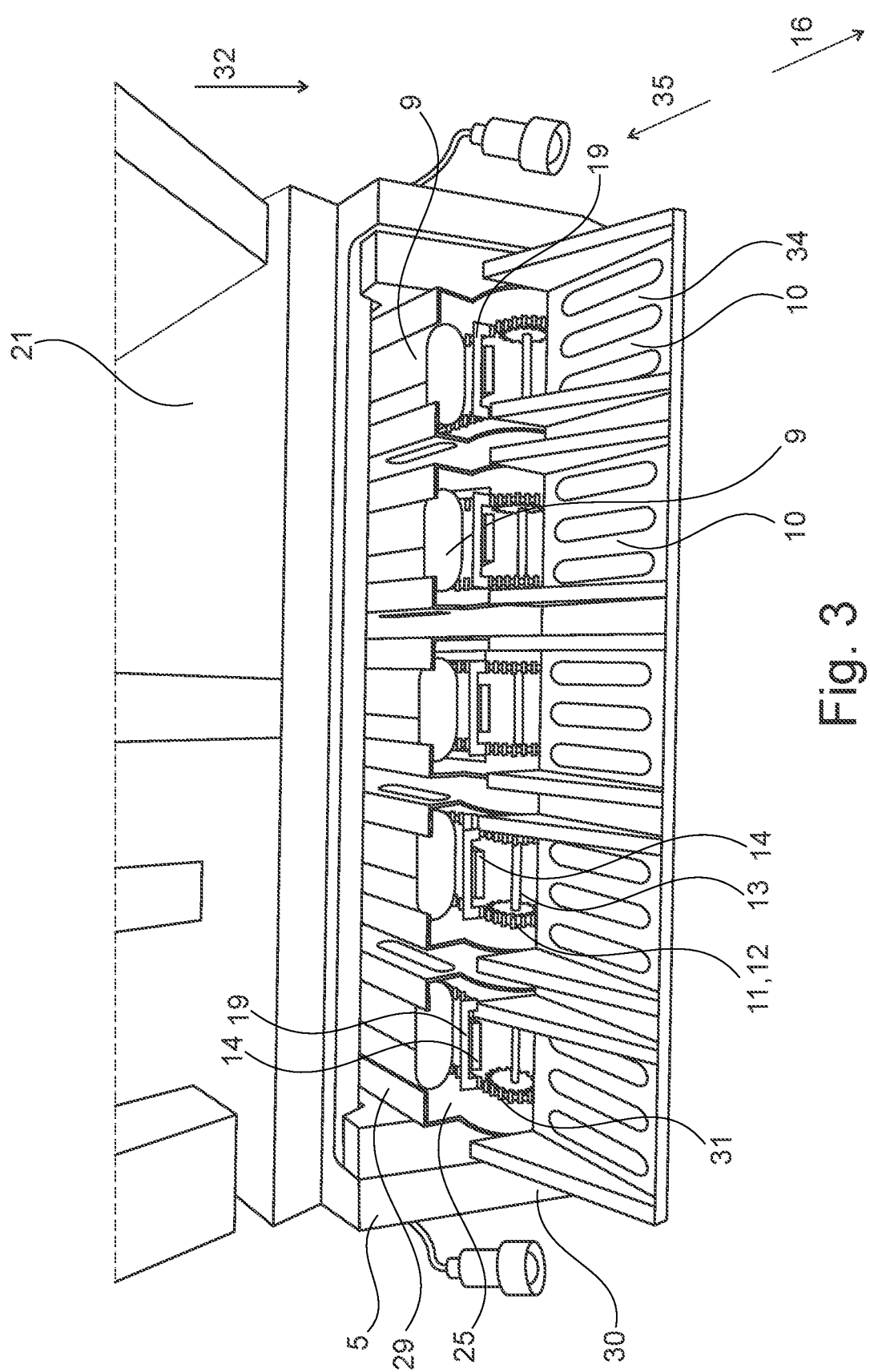
FIG. 3 is a closer view of the front of the ROV and carrier of FIG. 2 seen from the front.

FIG. 3 is a closer view of the ROV and carrier of FIG. 2 seen from the front. The manipulator arm 22 is not illustrated in FIG. 3. Five nodes 9 are located next to each other at the front of the ROV 21 and the carrier 5. Each of these nodes 9 is an outer node or front node in a row of nodes extending between the front of the carrier 5 and an interior 8 of the carrier 5, see FIG. 2, for storing the nodes. A ramp 34 in front of the nodes 9 forms node transfer positions 10, one for each row of nodes 9, for transferring the nodes 9 to and from the carrier 5. The rows of nodes 9 are movable in their longitudinal direction, which will be discussed with reference to FIG. 4.

With further reference to FIG. 2, the manipulator arm 22 is of a known kind, comprising links and joints and a gripping tool 23 which includes a suction cup with a controllable suction mechanism for gripping and releasing the nodes 9. Alternatively, the gripping tool may include gripping fingers or any other means for gripping the nodes. For the purpose of being gripped, the nodes may have handles or other gripping portions. The gripping tool 23 can reach the nodes 9 in all the node transfer positions 10.

The manipulator arm 22 can transfer nodes from the carrier 5 to the sea floor 4. When doing that, the gripping tool 23 first grips a node 9 in the node transfer position 10, as illustrated with node 9' for the rightmost node transfer position 10 in FIG. 2. The manipulator arm 22 then lifts the node from the node transfer position 10 and places it on the sea floor 4 and releases it, as illustrated with node 9" in FIG. 2. As nodes 9 are transferred from the node transfer positions 10, new nodes 9 can be moved from the row of nodes to the node transfer positions 10, which will be discussed in more detail with reference to FIG. 4.

The manipulator arm 22 can also transfer nodes from the sea floor 4 to the carrier 5. This is the reverse operation, i.e. the gripping tool 23 first grips the node 9" on the sea floor 4, then lifts it from the sea floor 4 to the node transfer position 10 and releases it. The node can then be moved from the node transfer position 10 to the row of nodes, which will be discussed in more detail with reference to FIG. 4.

Each of the five rows of nodes are located in a magazine. Thus, the carrier 5 has five magazines with nodes. The magazines are placed in a frame 30 of the carrier 5. The ramp 34 forming the node transfer positions 10 is part of the carrier, however, the ramp may be part of the magazine, i.e. each magazine may have its own ramp.

Figure 4:
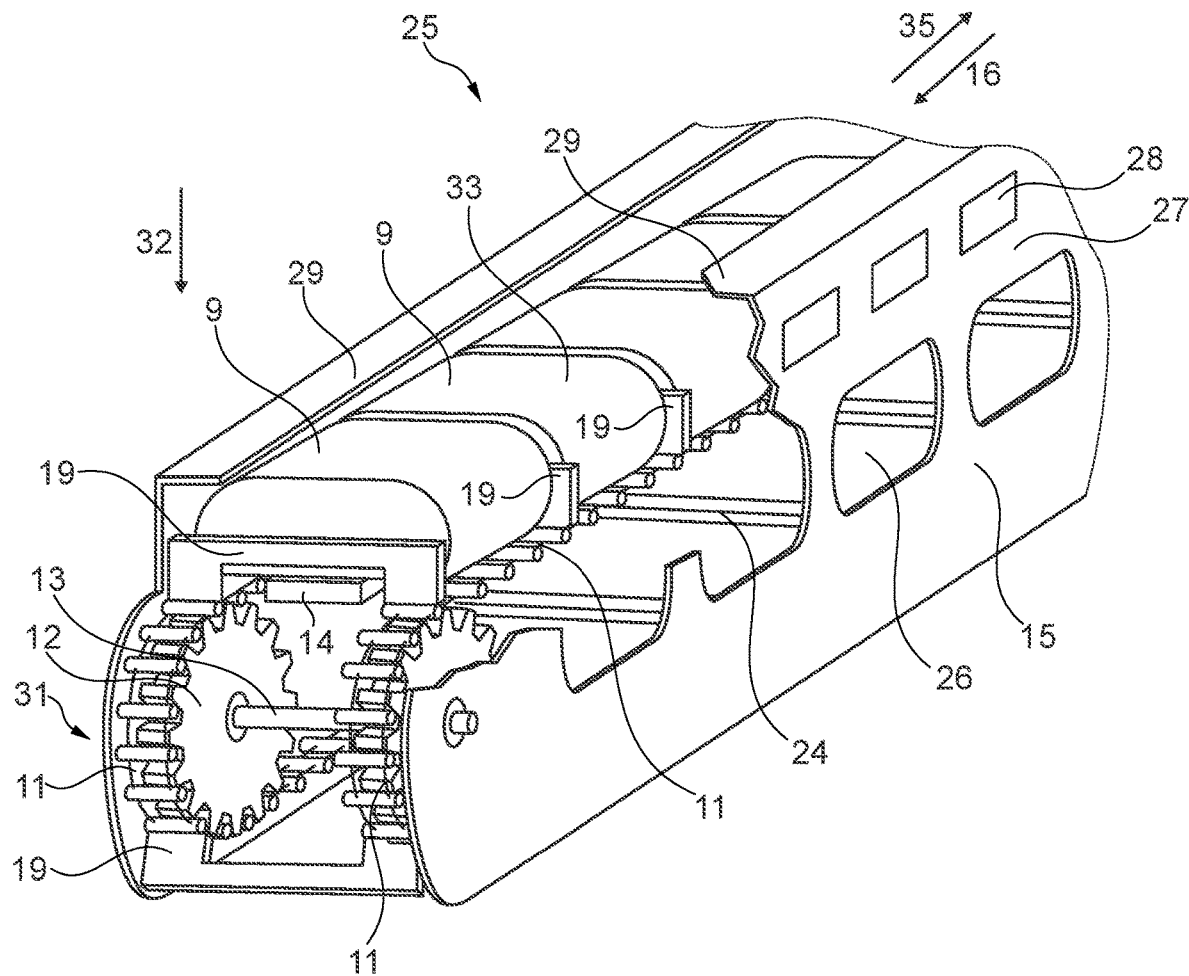
FIG. 4 illustrates a magazine for seismic nodes.

FIG. 4 illustrates an embodiment of an exchangeable magazine 25 for the nodes 9. A portion of the structural parts is cut away for illustrative purposes. The magazine 25 is oriented in the position in which it is used in FIG. 3, and references to "upper", "lower", "above", "below" and similar terms related to relative location, should be understood in this way, ref. downwards vertical direction 32.

The magazine comprises two longitudinal side plates 15 held together and stiffened by structural members 24. Two endless chains 11 extend substantially over the length of the magazine 25, and have lower portions near a bottom of the magazine 25, upper portions approximately in the middle of the magazine 25, front portions arranged on respective free running sprockets 12 near a magazine front end 31, and rear portions arranged on respective not illustrated drive sprockets near an opposite, not illustrated rear end of the magazine 25. The free running sprockets 12 are rotatably mounted on an axle 13 extending between and attached to the side plates 15 of the magazine 25. The drive sprockets are mounted on a not illustrated common drive shaft, which in turn is driven by a not illustrated electric or hydraulic motor.

A support 14 made of a plate or rail connected to the structural members 24 extends in the longitudinal direction of the magazine 25 between the chains 11. The upper portions of the chains are located below the support 14. Pushers 19 are attached to the chains 11 at intervals, and extend above the support 14.

The nodes 9 are arranged in a row 33 and slidably carried on the support 14, with a pusher 19 between each node 9. The intervals between the pushers 19 correspond to the length of the nodes 9 plus a clearance. "The length of the nodes" means the outer dimension of each node in a longitudinal direction 16, 35 of the magazine 25. The clearance is as a minimum the distance required for a practical placement of the nodes 9 on the support 14, and may be between 2 and 20 mm, typically 8 mm. In other words, the intervals between the pushers 19 are adapted to the nodes 9 and the way they are placed on the support 14.

The row 33 of nodes extends in the longitudinal direction 16, 35 of the magazine 25, from its front end 31 to a location away from the front end in the interior 8 of the carrier 5, see FIG. 2. Since the pushers 19 are located between the nodes 9, the pushers push the row 33 of nodes along the support 14 when the chains 11 are moved. When the motor driving the chain 11 is run in a first direction, the upper portion of the chain 11 moves inwards in direction 35, and the pushers 19 push the row 33 of nodes 9 inwards along the support 14 towards the magazine rear end. When the motor driving the chain 11 is run in a second direction opposite the first direction, the upper portion of the chain 11 moves outwards in direction 16, and the pushers 19 push the row 33 of nodes 9 outwards along the support 14 towards the magazine front end 31.

Upper portions of the side plates 15 form guide plates 27 that keep the nodes 9 laterally in place in the row 33 and guide the nodes 9 during their movement in the magazine 25. The guide plates 27 have top portions 29 bent in right angles towards the row 33 of nodes 9. When the carrier 5 is on the sea floor 4, and during lowering and raising of the carrier 5, the nodes 9 will be kept in place on the support 14 by the gravitation acting in vertical direction 32, see FIGS. 1 and 2. However, if the carrier 5 is undesirably tilted, the guide plates' top portions 29 prevent the nodes from moving perpendicularly off the support 14, away from the support 14. Openings 26 in the side plates 15 and openings 28 in the guide plates 27 reduce weight and allow flow-through of water.

Figure 5:
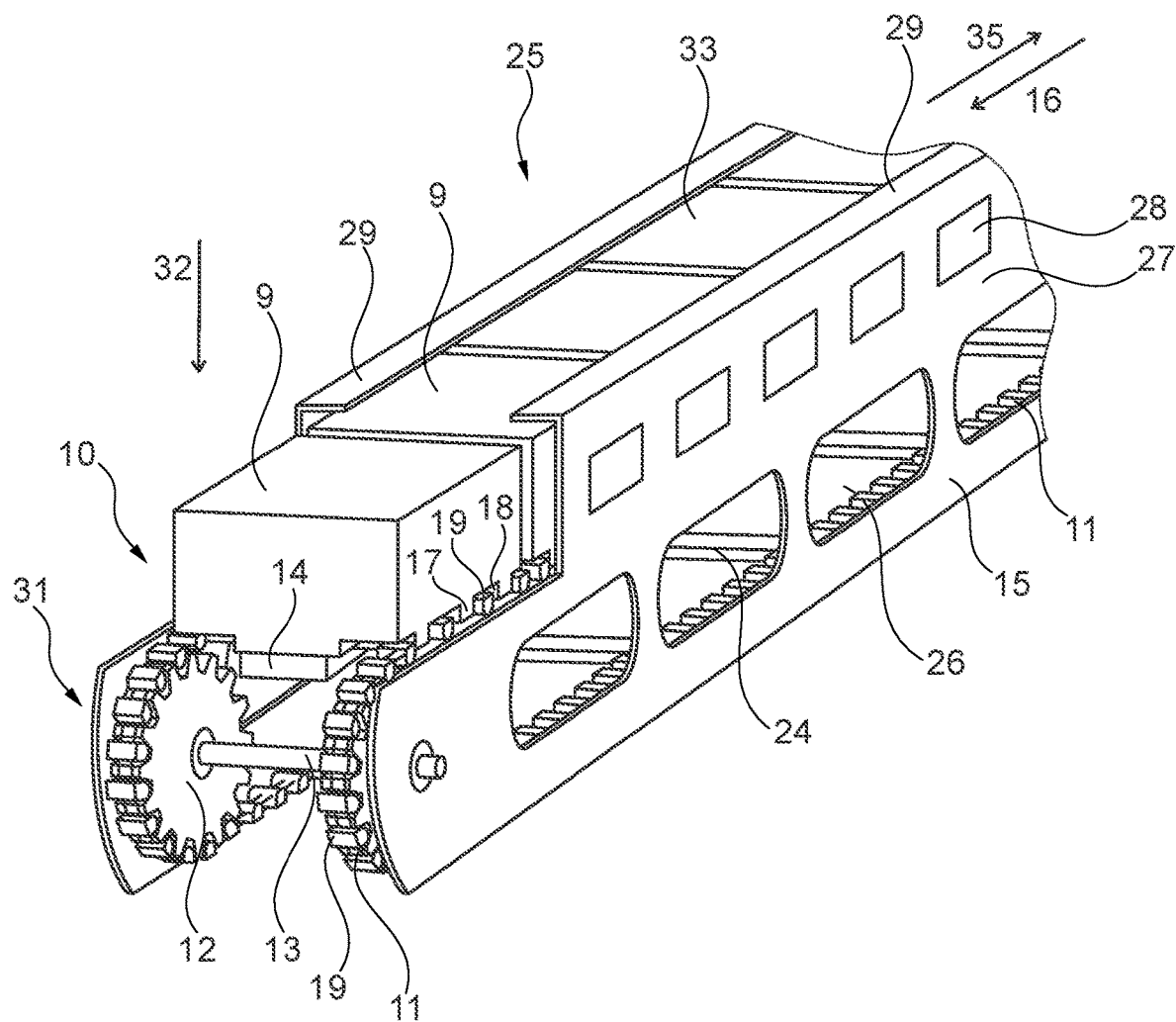
FIG. 5 illustrates another magazine for seismic nodes.

FIG. 5 illustrates an alternative embodiment of both the magazine 25 and the nodes 9. This magazine has similar longitudinal side plates 15, structural members 24, sprockets 12, axle 13 and not illustrated drive sprockets and motor as the magazine in FIG. 4. Like FIG. 4, a row 33 of nodes 9 is slidably carried on a support 14 arranged between the chains 11, i.e. one chain 11 is arranged on each side of the support 14. Further, upper portions of the chains 11 are located below the support 14, and pushers 19 attached to the chains 11 extend above the support 14. The pushers 19 are, however, different.

The pushers 19 of FIG. 5 are smaller and located with much smaller intervals than in FIG. 4. The nodes are also different. The nodes generally have a square shape, which is insignificant to the invention. Further, the undersides of the nodes 9 have gripping portions formed by alternating cogs 17 and notches 18. When the node 9 is placed on the support 14, the pushers 19 enter the notches 18 and abut the cogs 17, and when the chains 11 move, the pushers 19 thereby push the nodes 9.

Further, unlike the magazine 25 of FIG. 4, in the magazine of FIG. 5 the node transfer position 10 is on the support 14 in the magazine front end 31. This means that the magazine of FIG. 5 can be used in a carrier 5 without the ramp 34. There are no guide plates 27 with top portions 29 at the location for the node transfer position 10, which enables a manipulator arm 22 to lift nodes 9 to and from the node transfer position 10 on the support 14. Both the embodiment with the node transfer position 10 on the support 14 and the embodiment with the pushers 19 engaging gripping portions in the undersides of the nodes are shown in FIG. 5. This does, however, not mean that these two embodiments are linked to each other.

When loading seismic nodes 9 into the carrier 5 with the magazine of FIG. 4, the magazine is located adjacent the node transfer position 10 on the ramp 34. The manipulator arm 22 places a node 9 in the node transfer position 10 on the ramp 34, as discussed above. Assuming there initially are no nodes in the magazine 25, there will be empty space on the support 14 at the magazine front end 31. Further, it is assumed that the pushers 19 have a position and movement where they do not block the access to the support 14 from the node transfer position 10. This can be achieved by the chains 11 being stopped and one pusher 19 being located at the sprockets 12 between and below the node transfer position 10 and the support 14, and the next pusher being located a distance from the magazine front end 31. The manipulator arm 22 then pushes the node 9 onto the support 14 at the magazine front end 31. For this purpose, the manipulator arm 22 may use the gripping tool 23 or another suitable tool mounted on the manipulator arm. Alternatively, the manipulator arm 22 may initially place the node 9 partly on the support 14, to ease the transfer of the node 9 from the node transfer position 10 to the support 14. The chains 11 are started, and a pusher 19 contacts the node 9 and pushes it towards the interior 8 of the carrier 5. The chains 11 may be started before the node 9 has been completely pushed onto the support 14, to provide a smooth transfer of the node 9 from the node transfer position 10 to the support 14. When the node 9 has moved a length corresponding to a length of the node 9 plus the clearance (the clearance is discussed above) the chains 11 are stopped. Then there will be an empty space on the support 14 at the magazine front end 31, and the magazine is ready for receiving another node 9. The manipulator arm 22 places another node 9 in the node transfer position 10, and the above steps are repeated as long as desired. Consecutive transferred nodes 9 thereby form a row 33 starting in the node transfer position 10 and extending towards the interior 8 of the carrier 5.

When loading seismic nodes 9 into the carrier 5 with the magazine of FIG. 5, since the node transfer position 10 is on the support 14, the ramp 34 in the carrier 5 may be dispensed with. The manipulator arm 22 places a node 9 directly in the node transfer position 10 on the support 14. The magazine of FIG. 5 also shows the alternative with the pushers 19 engaging gripping portions in the undersides of the nodes 9, and therefore, during placing of the node 9 on the support 14, it must be ensured that the pushers 19 enter the notches 18. For this purpose, the chain 11 with the pushers 19 may be moved simultaneously. In other respects, loading seismic nodes 9 into the carrier 5 with the magazine of FIG. 5 is the same as loading with the magazine of FIG. 4.

In another not illustrated embodiment, the alternative with the pushers 19 engaging gripping portions in the undersides of the nodes 9 may be used together with the node transfer position 10 being located on the ramp 34. In this case it may be advantageous to move the chains 11 when moving the nodes from the node transfer position to the support 14, to ensure that the pushers 19 enter the notches 18.

Unloading of seismic nodes from the carrier 5 is the same for both the magazine of FIG. 4 and FIG. 5. It is assumed that the nodes 9 initially are stored on the support 14 in a row 33 between the interior 8 of the carrier 5 and the magazine front end 31, with no node in the node transfer position 10. The chain 11 is started and run in direction 16 to make the pushers 19 push the row 33 of nodes 9 towards the node transfer position 10. The chain 11 is stopped when a node 9 has arrived at the node transfer position 10. For the magazine of FIG. 4, this means that the front node 9, i.e. the node in the magazine front end 31, is pushed off the support 14, onto the ramp 34. For the magazine of FIG. 5, this means that the front node 9 stays on the support 14. The node is then removed from the node transfer position 10 by means of the manipulator arm 22. Then the chain 11 is started to bring a new node 9 to the node transfer position 10, and the above process is repeated as long as desired.

The start/stop of the motor for the drive sprockets is controlled by the control system or the operator. For this purpose, a sensor which detects presence of a node 9 in the node transfer position 10 is in communication with the control system, and when unloading nodes from the carrier 5, the motor for the drive sprockets may thereby be started automatically when the node transfer position 10 is empty. Alternatively, the operator may use a camera on the ROV to visually detect the presence of a node in the node transfer position 10.

Desired weight distribution in the carrier 5 can be achieved by a suitable sequence of transfer of the nodes from the various node transfer positions 10 and suitable movement of the nodes 9 inside the carrier 5. Further, some nodes may be kept in the rear portion of the magazine 25, i.e. the interior 8 of the carrier.

Before deploying the nodes, when the carrier is on the vessel or on shore, the nodes will be loaded into the magazines, and the magazines will be placed in the carrier. Alternatively, the nodes may be loaded into the magazines while the magazines are in the carrier, by means of the pushers as described above. After retrieving the nodes, i.e. after the nodes have been picked up from the sea floor and placed in the magazines and the ROV with the carrier has been moved to the sea surface and lifted aboard the vessel, or possibly on shore, the magazines will be removed from the carrier, and the nodes will be unloaded from the magazines. Alternatively, the nodes may be unloaded from the magazines while the magazines are in the carrier, by means of the pushers as described above.

The carrier 5 and the structural parts of the magazines 25 may be made from steel, which is favourable due to strength and material cost.

The invention claimed is:

1. A carrier for transporting seismic nodes to and from a sea floor, comprising:
   an interior of the carrier for storing the seismic nodes during transport;
   a manipulator arm for moving the seismic nodes into and out of the interior of the carrier;
   a node transfer position, formed by a ramp in front of the seismic nodes, for transferring the seismic nodes to and from the carrier;
   a support for supporting the seismic nodes between the interior of the carrier and the node transfer position, wherein each of the seismic nodes is an outer node or a front node in a row of the seismic nodes, wherein the seismic nodes extend between front of the carrier and the interior of the carrier, and wherein the row of the seismic nodes is movable in a longitudinal direction which extends from the interior of the carrier to the front of the carrier and is a direction parallel to the sea floor; and
   an endless driven belt with pushers for pushing the row of the seismic nodes;
   a drive wheel or sprocket for driving the belt, wherein the belt is driven by the drive wheel or sprocket with a common drive shaft driven by a motor.

2. The carrier of claim 1, wherein the node transfer position is on the ramp outside the support.

3. The carrier of claim 1, wherein the node transfer position is on the support.

4. The carrier of claim 1, further comprising a guide for the row of the seismic nodes.

5. The carrier of claim 1, wherein the belt is positioned below the support and the pushers extend above the support.

6. The carrier of claim 1, wherein the pushers are spaced along the belt with a distance corresponding to a length of a seismic node plus a clearance.

7. The carrier of claim 1, wherein the pushers are adapted to push gripping portions of the seismic nodes.

8. The carrier of claim 4, wherein the guide comprises a retaining portion to prevent the seismic nodes from moving perpendicularly off the support.

9. The carrier of claim 1, wherein the support is a longitudinal support and one of the belt is situated on each side of and below the support, with the pushers extending above the support, wherein two of the belts are driven by respective drive wheels or sprockets with the common drive shaft driven by the motor, and wherein the pushers are attached to the two belts.

10. The carrier of claim 1, further comprising two longitudinal supports for each row of the seismic nodes, and wherein the belt is situated between and below the supports with the pushers extending above the supports.

11. The carrier of claim 1, further comprising a number of rows of the seismic nodes.

12. The carrier of claim 1, further comprising exchangeable magazines for the seismic nodes, each of the magazines comprises components for moving the row of the seismic nodes.

13. The carrier of claim 1, wherein the carrier is dockable to an ROV.

14. The carrier of claim 1, wherein the carrier is stackable and dockable to another carrier.

* * * * *